UNITED STATES PATENT OFFICE.

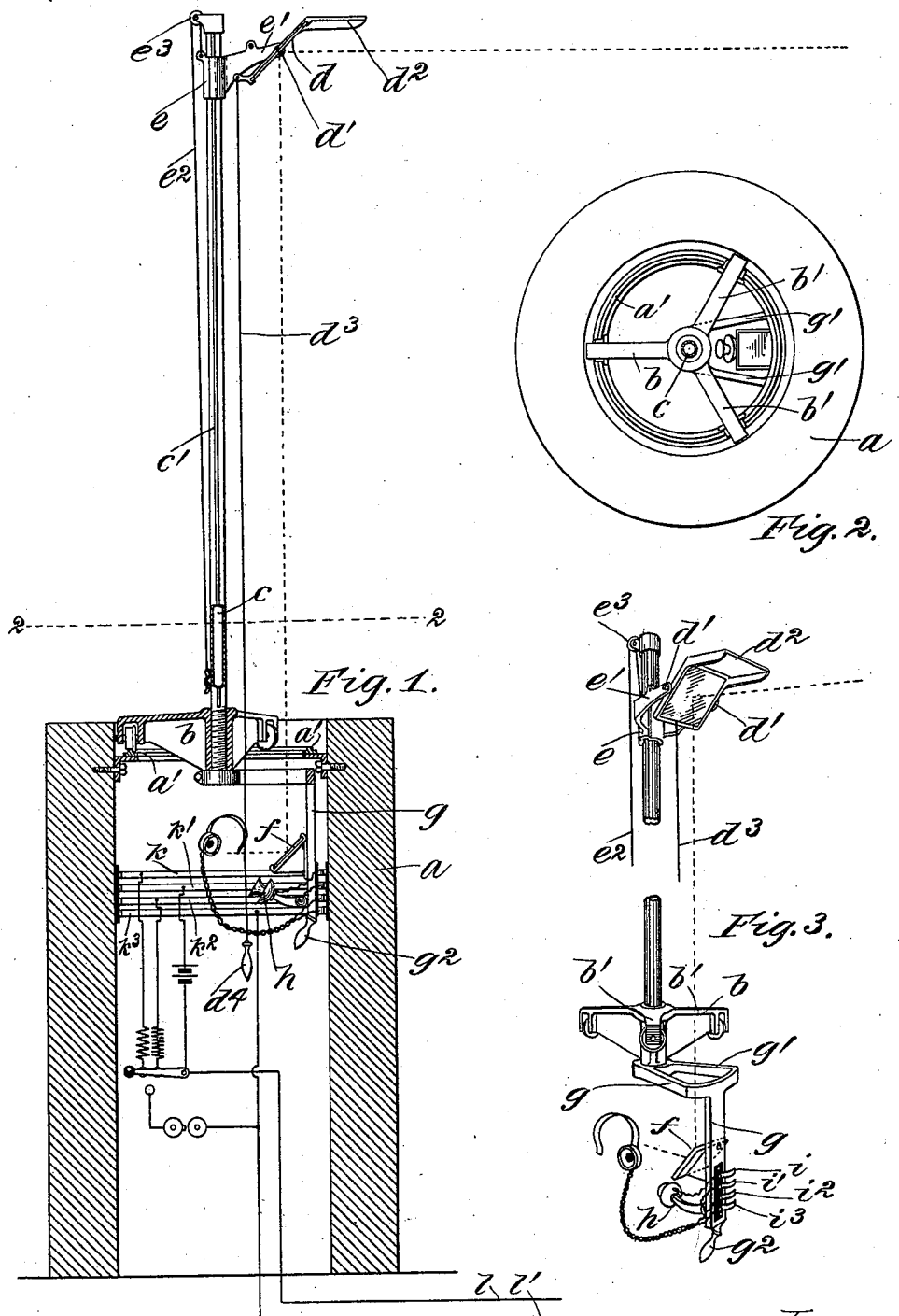

BRADLEY ALLEN FISKE, OF THE UNITED STATES NAVY, ASSIGNOR TO THE WESTERN ELECTRIC COMPANY, OF CHICAGO, ILLINOIS.

CONNING-TOWER FOR WAR-SHIPS.

SPECIFICATION forming part of Letters Patent No. 649,046, dated May 8, 1900.

Application filed September 7, 1899. Serial No. 729,777. (No model.)

*To all whom it may concern:*

Be it known that I, BRADLEY ALLEN FISKE, a lieutenant in the United States Navy, have invented a certain new and useful Improvement in Apparatus for Conning-Towers of War-Ships, (Case No. 3,) of which the following is a full, clear, concise, and exact description.

My invention relates to apparatus for conning-towers of war-ships, and has for its object to provide means to enable the captain or other officer within the ship to see clearly what is passing outside without exposing himself and without the necessity of providing slits through the sides of the conning-tower to look through.

At present an armored conning-tower is usually provided on vessels of war, such tower having narrow slits around its sides, and the commanding officer stations himself here for protection, looking through the slits to view the surroundings, so that he may properly direct the course of his ship. For structural reasons, however, the conning-tower must be kept as low down as possible, and to prevent weakening it the slits are made so small as to be of little value. The result is a decrease of the fighting efficiency of the guns and ship, due to the defective control which is had over them. In fact, many commanders now consider it preferable to go outside during an engagement, so that they may see clearly, it being thought that the advantage of clear vision more than compensates for the risking of their own lives and the consequent loss to the ship which the death of its commanding officer at a critical time would entail. This invention is intended, generally speaking, to enable the officer to see as clearly as though he were out in the open above the guns and boats and at the same time to be more fully protected than before. It may be described as consisting of an arrangement of mirrors, one placed within the ship or conning-tower, which is inclosed around its sides and open at the top to permit the passage of light, and another located above it and adapted to reflect the light from surrounding objects down into the first-mentioned mirror within the tower, the position of the upper mirror being controllable from within the tower. The lower mirror is preferably mounted fixedly with relation to the upper mirror, so that the latter may always be seen by looking into it, and the upper mirror is preferably hung on trunnions or pivots, so that it may be tilted at various angles to the vertical. Means are also preferably provided for turning the upper mirror or both mirrors about a vertical axis. It will therefore be understood that a person within the conning-tower may by manipulating the mirrors see the surrounding objects reflected in the lower mirror just as though his eye were located in the place occupied by the upper mirror. In proximity to the lower mirror I preferably mount a telephone instrument, which is adapted to be moved about with the mirror, so as always to be in a proper operative position for the person looking into the latter, and electrical-contact parts are provided for maintaining continuous electrical connection between said telephone instrument and the stationary telephone-circuit, which is connected to the telephone central office. The officer may thus keep up constant communication with the central office, from which his orders may be transmitted in the usual way to the men at the engines, helm, and guns.

I will describe the details of my invention more particularly by reference to the accompanying drawings, wherein—

Figure 1 is a vertical sectional view of a conning-tower equipped in accordance with my invention. Fig. 2 is a sectional plan view thereof on line 2 2 of Fig. 1, and Fig. 3 is a detail perspective view of the two mirrors with their revolving support and the telephone instrument.

Similar letters of reference are used to designate the same parts wherever they are shown.

The tower $a$ is shown as cylindrical in shape and open at the top. Around its inner wall is mounted the circular track $a'$, upon which the revolving carriage $b$ is adapted to travel. Coincident with the vertical axis of the circular track a hollow steel mast $c$ is mounted upon the said carriage, being preferably screwed into the same, and it is from this mast that the upper mirror $d$ is supported. The manner of its support will be apparent at a glance at Figs. 1 and 3, whereby it will be seen that a collar $e$ is arranged to slide up and down the mast, and projecting from said collar are horizontally-extending arms $e'$ $e'$, in the ends of which the mirror is hung on trunnions $d'$ $d'$. The collar is prevented from turning relatively to the mast by means of a feather $c'$, extending longitudinally thereof. The lower mirror $f$ is supported from the frame $g$, carried upon the under side of the revolving carriage $b$. The arms $g'$ $g'$ of said frame and the legs $b'$ $b'$ of the carriage are so disposed with relation to the mirrors as not to obstruct the passage of light between them. The upper mirror $d$ is provided with a protecting-roof $d^2$, which also serves as a weight, tending to rotate the mirror upon its trunnions in a clockwise direction, considered as in Fig. 1, and a line $d^3$ is attached to a projection on the lower end of the mirror and extends downward into the conning-tower, whereby the mirror may be rotated to assume any desired angle.

I preferably mount a telephone transmitting instrument $h$ upon the supporting-framework $g$ immediately below the lower mirror, and a receiving head-telephone $h'$ of the kind usually worn by telephone-switchboard operators is also associated therewith. Four contact springs or brushes $i$ $i'$ $i^2$ $i^3$ are mounted upon the framework $g$ and serve to make electrical connection with the contact-strips $k$ $k'$ $k^2$ $k^3$, respectively, which extend around the inner wall of the conning-tower, the said contact strips or brushes constituting the terminals of the telephone transmitting and receiving instruments. The contact-strips $k$, &c., may be permanently connected with the usual telephone switching mechanism, induction-coil, battery, and bell, and thence by means of conductors $l$ $l'$ to the central telephone-switchboard of the ship. A handle $g^2$ is provided upon the lower part of the supporting-frame $g$, which may be grasped by the officer to rotate the carriage, and it will be seen that in whatever position the carriage may be perfect telephone communication may be had through said contact-strips $k$, &c., and the contact-brushes engaging therewith and mounted upon the said frame.

If the ship is in an upright position—that is, "on even keel"—an object in the same horizontal plane with the upper mirror will be reflected downward into the lower mirror, and thence horizontally into the eye of the observer, so that it will be seen exactly as though looked at directly.

If the ship is rolling in a seaway—that is, rotating in a vertical plane—it will be necessary to turn the upper mirror to "follow" the object which is under observation. The line $d^3$ for rotating the mirror terminates at its lower end in a handle $d^4$, which may be grasped by the officer, so that he may by pulling or slacking the line adjust the mirror to compensate for movements of the ship or movements of the object. It is clear then that by manipulating the line $d^3$ with one hand and the carriage $b$ through the medium of the handle $g^2$ with the other hand he may turn the mirror to face in any direction desired and will at all times have the telephone in a convenient position, since it is fixedly mounted with relation to the lower mirror into which he looks. Since the image of the object is not really in the mirror, he may examine its reflection with his marine glass as easily as if he were looking at the object directly, and thus secure the benefit of the magnifying power of such marine glass.

It is evident that my invention is capable of various modifications which will readily suggest themselves to those skilled in the art. For instance, the same optical arrangement can obviously be used for directing the guns of a turret, in which case the turret itself would take the place of the carriage $b$ and would be turned until the reflected image of the target appears in the lower mirror. This renders unnecessary the exposure of the gun-captain and his telescope above the top of the turret in the small "sighting-hood" at present used.

Should the upper mirror become dimmed by smoke or mist, it may be lowered by means of the rope $e^2$, which supports the movable collar $e$, passing over the pulley $e^3$ at the top of the mast and fastened at the bottom of the mast to a cleat $e^3$. The mirror may then be wiped and hoisted again to its proper position. The mast $c$ is preferably screwed onto the carriage $b$, so that should the mast or mirror be shot away (in spite of the small target which they present) the stump may quickly be unscrewed from the carriage $b$ and a spare mast and mirror substituted.

I am aware that it is old to use two mirrors disposed substantially parallel to one another to enable a person behind a fortification to see what is passing outside without exposing himself. I believe, however, that I am the first to adopt this idea in the manner and for the purpose set forth above.

Having thus described my invention, I claim as new and desire to secure by Letters Patent the following:

1. In an apparatus for conning-towers of ships, consisting of a mirror $f$ within the tower, a support $c$ extending above the tower, a second mirror $d$ mounted upon the support, means, controllable from within the tower for tilting the upper mirror $d$ at varying angles, and means for rotating the mirror $d$ about a vertical axis, whereby, as the ship rolls, light from a distant object may be continuously reflected downward from the mirror $d$ into the mirror $f$, wherein a reflection of such object may be seen, as set forth.

2. A conning-tower for war-ships, having an opening in its top through which light may pass, a support $c$ extending upward from said opening, a mirror $d$ mounted upon said support, and a mirror $f$ within the tower into which light from mirror $d$ is adapted to be reflected, substantially as described.

3. A conning-tower for war-ships having an opening in its top through which light may pass, a mirror $f$ within the tower, a mirror $d$ disposed above the tower and adapted to reflect light from surrounding objects downward into said mirror $f$, and means, controllable from within the tower, for adjusting said mirror $d$ at varying angles, substantially as set forth.

4. The combination with the support $c$, of means for rotating the same, a mirror $d$ carried by said support, means for raising and lowering said mirror upon the support, and means, controllable from the bottom of the support for tilting said mirror in a vertical plane to cause the face of said mirror to present different angles to the vertical, substantially as set forth.

5. The combination with two mirrors $d\,f$ disposed one above the other, a common support $c$ for said mirrors, means, controllable from the lower mirror, for tilting the upper mirror at varying angles, and means for rotating both of said mirrors together about a vertical axis, substantially as described.

6. An apparatus for war-ships consisting of a pair of mirrors $d\,f$ disposed one above the other and inclined at such angles with the vertical that the reflections of objects surrounding the upper mirror may be seen in the lower mirror, means for moving both of said mirrors together about a vertical axis, a telephone instrument associated with the lower mirror, and a support and electrical connections for said telephone instrument permitting the same to be moved simultaneously with said lower mirror to remain adjacent thereto in whichever position said lower mirror may be adjusted, substantially as and for the purpose set forth.

7. In an apparatus for conning-towers of ships, the combination with a carriage $b$, of a support $c$ mounted thereon, a mirror $d$ mounted upon said support, a mirror $f$ supported from said carriage and adapted to receive light reflected from it into mirror $d$, and means for tilting the mirror $d$ at varying angles, whereby as the ship rolls the light-rays from any object may be continually reflected downward through the mirror $d$ into the mirror $f$, substantially as described.

8. In an apparatus for conning-towers of ships, the combination with a carriage $b$, of a support $c$ mounted thereon, a track upon which said carriage is adapted to travel, a mirror $d$ mounted upon said support, a mirror $f$ supported from said carriage and adapted to receive light-rays into it from mirror $d$, means for tilting the mirror $d$ at varying angles, whereby as the vessel rolls the rays of light from any object may continually be reflected downward from mirror $d$ into mirror $f$, a telephone instrument associated with said mirror $f$ and supported from said carriage, a telephone-circuit, and means for maintaining the electrical connection between the telephone and the telephone-circuit in any position of said carriage, substantially as set forth.

In witness whereof I hereunto subscribe my name this 22d day of July, A. D. 1899.

BRADLEY ALLEN FISKE.

Witnesses:
GEO. R. CLARK,
D. W. KNOX.